United States Patent [19]

Hagen

[11] Patent Number: 4,522,070

[45] Date of Patent: Jun. 11, 1985

[54] METHOD AND APPARATUS FOR CORRECTING BAROMETRIC PRESSURE FOR WIND VELOCITY AND DIRECTION

[75] Inventor: Floyd W. Hagen, Eden Prairie, Minn.

[73] Assignee: Rosemount Inc., Eden Prairie, Minn.

[21] Appl. No.: 537,642

[22] Filed: Sep. 30, 1983

[51] Int. Cl.³ .............................................. G01L 7/00
[52] U.S. Cl. ...................................... 73/384; 73/182
[58] Field of Search ................. 73/384, 182, 179, 189, 73/386

[56] References Cited

U.S. PATENT DOCUMENTS

| | | | |
|---|---|---|---|
| 2,270,476 | 1/1942 | Rollin | 73/384 X |
| 3,093,000 | 6/1963 | Richie et al. | 73/384 |
| 3,443,431 | 5/1969 | Hagen | 73/182 X |
| 4,304,137 | 12/1981 | Mott | 73/182 X |

Primary Examiner—Stewart J. Levy
Assistant Examiner—Joseph W. Roskos
Attorney, Agent, or Firm—Kinney & Lange

[57] ABSTRACT

A method and a sensing instrument are claimed for sensing atmospheric pressure. The instrument (24) comprises an enclosure (26) that has a shape exposed to a fluid medium, which fluid medium may be moving at a certain velocity relative to the sensing instrument. The sensing instrument has at least one port (28) open to the fluid medium for sensing the velocity of the medium and for measuring a pressure of the fluid medium. The measured pressure is corrected for the effects of the velocity of the medium according to the formula $$P_{ATM} = P_M + K_2 V^2$$

where $P_{ATM}$ is atmospheric pressure, $P_M$ is measured pressure in the enclosure, $K_2$ is a constant that is a function of the shape of the enclosure, the shape of the port and the density of the medium and V is the velocity of the medium.

12 Claims, 6 Drawing Figures

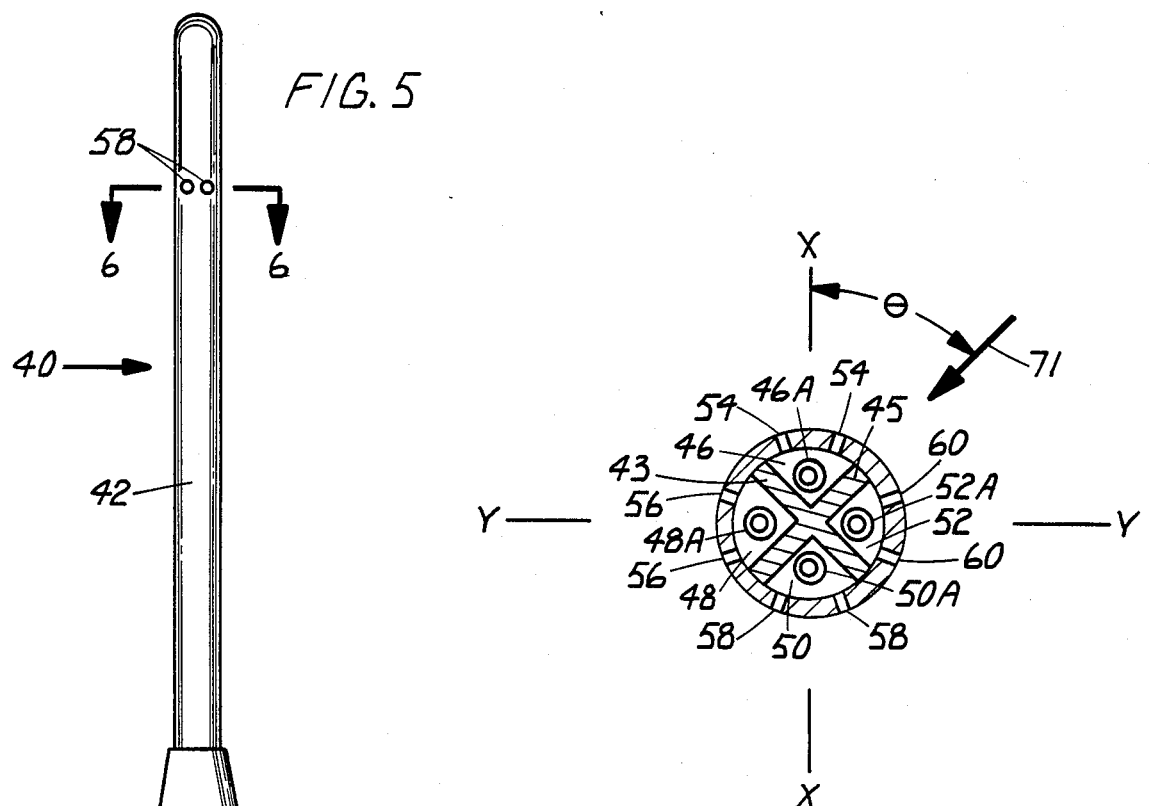
FIG. 5
FIG. 6
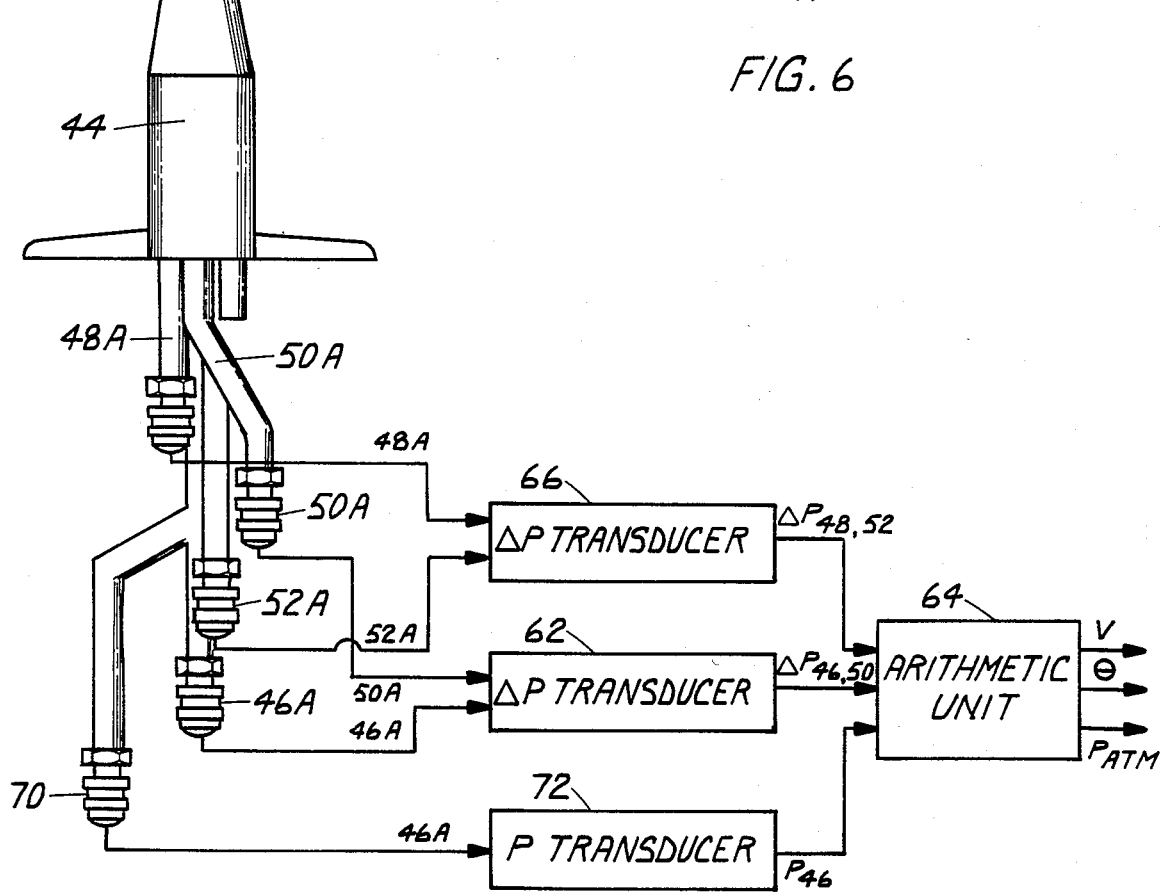

METHOD AND APPARATUS FOR CORRECTING BAROMETRIC PRESSURE FOR WIND VELOCITY AND DIRECTION

BACKGROUND OF THE INVENTION

1. Field of the Invention

The present invention relates to barometers and specifically to a method and apparatus for correcting a sensed barometric pressure for errors caused by wind velocity and direction.

2. Prior Art

In the past, solutions to account for the recognized errors caused by wind velocity and direction in the barometric pressure sensed in an enclosure with ports open to the atmosphere have been less than satisfactory. Principally these solutions have revolved around providing mechanical baffles to dissipate the kinetic energy of the wind, leaving only the static or barometric pressure to be sensed in the enclosure. Such a device is described in the paper entitled "Design and Testing of Barometer Inlets to Eliminate Wind Velocity Error in NOAA Data Buoy Installations" by Ronald T. Miles, John F. Holmes and Joseph H. Greer and presented at the Instrument Society of America Conference at Niagara Falls, New York on Oct. 16-20, 1977.

The method of an apparatus made according to the present invention utilizes a definable relationship between the wind velocity and direction and the physical characteristics of the enclosure and the ports therein to provide a factor that is applied to the pressure that is measured in the enclosure to obtain an accurate static or barometric pressure. Thus the present invention eliminates the need for a baffle system to account for the effects of the kinetic energy of the wind.

SUMMARY OF THE INVENTION

A method and a sensing instrument are claimed for sensing atmospheric pressure. The instrument comprises an enclosure that has a shape exposed to a fluid medium, which fluid medium may be moving at a certain velocity relative to the sensing instrument. The sensing instrument has at least one port open to the fluid medium for sensing the velocity of the medium and for measuring a pressure of the fluid medium. The measured pressure is corrected for the effects of the velocity of the medium according to the formula $$P_{ATM} = P_M + K_2 V^2$$

where $P_{ATM}$ is atmospheric pressure, $P_M$ is measured pressure in the enclosure means, $K_2$ is a constant that is a function of the shape of the enclosure means, the shape of the port means and the density of the medium and V is the velocity of the medium.

In another embodiment, the sensing instrument for sensing atmospheric pressure has a single set of ports open to the fluid medium for sensing a pressure of the fluid medium. The measured pressure is corrected for the effects of the velocity of the medium according to the formula $$P_{ATM} = P_M + K_3 V^2 f(\theta)$$

where $P_{ATM}$ is atmospheric pressure, $P_M$ is measured pressure in the enclosure, $K_3$ is a calibration constant, V is velocity of the medium and $f(\theta)$ is a variable that is a function of the shape of the enclosure and the shape of the ports and the direction of movement of the fluid medium, where $\theta$ is the direction of the movement of the medium relative to the port.

DESCRIPTION OF THE DRAWINGS

FIG. 5 side view of a cylindrical sensor having a single set of static pressure sensing ports.

FIG. 6 is a sectional view taken along line 6—6 in FIG. 5.

DESCRIPTION OF THE PREFERRED EMBODIMENT

Atmospheric or barometric pressure is the undisturbed or static pressure at the point of measurement. It is known that measurement of such pressure inside an enclosure that has ports open to the atmosphere may be subject to errors caused by wind velocity and direction.

Figure 1:
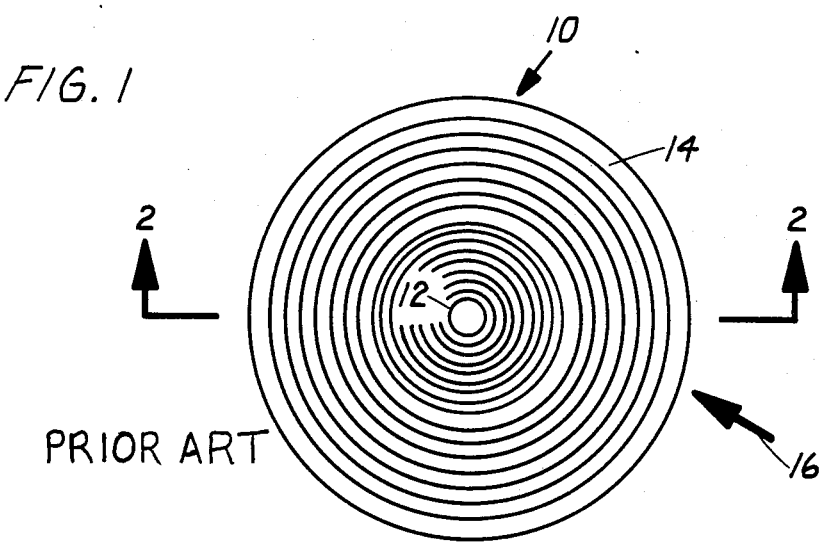
FIG. 1 top view of a prior art device.
Figure 2:
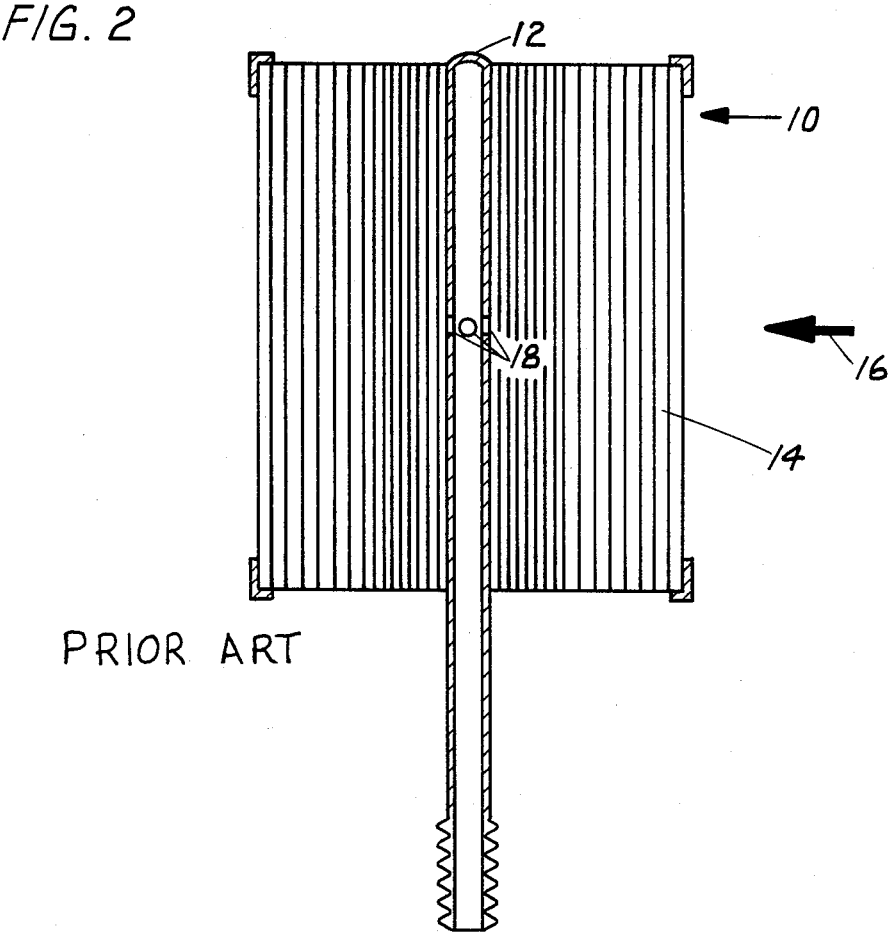
FIG. 2 sectioned view of a prior art device taken along line 2—2 in FIG. 1.

FIG. 1 shows prior art device 10 which was designed to reduce the error introduced by the wind to the barometric pressure measurement. Enclosure 12 comprises a conduit capped on the end shown. Around enclosure 12 is an elaborate baffle comprised of layers of screen 14 wound concentrically around enclosure 12. The object is that wind, as shown for example by arrow 16 will expend its kinetic energy as it passes through the successive layers of screen such that only the atmospheric static pressure remains to be sensed at enclosure 12. This is more easily visualized in FIG. 2. The numbers in FIG. 2 correspond to those of FIG. 1. FIG. 2 shows enclosure 12 capped at the top and open at the thread bottom where measured pressure is extracted. Such pressure is admitted to enclosure 12 through ports 18. Here it can be seen that wind 16 may be impeded by the layers of screen 14 such that its kinetic energy may be dissipated prior to the pressure pick off at ports 18. It was found that wind 16 did not completely penetrate at the point of impact, but that some of such wind tended to flow around screen 14. This created a negative pressure on the far side of screen 16 which in turn induced an error into the pressure measured in enclosure 12. Accuracy was further degraded in inclement weather. In conditions of rain, a meniscus formed on screen 14 that effectively shielded enclosure 12 from atmospheric pressure. Screen 14 was additionally subject to severe icing problems.

Figure 3:
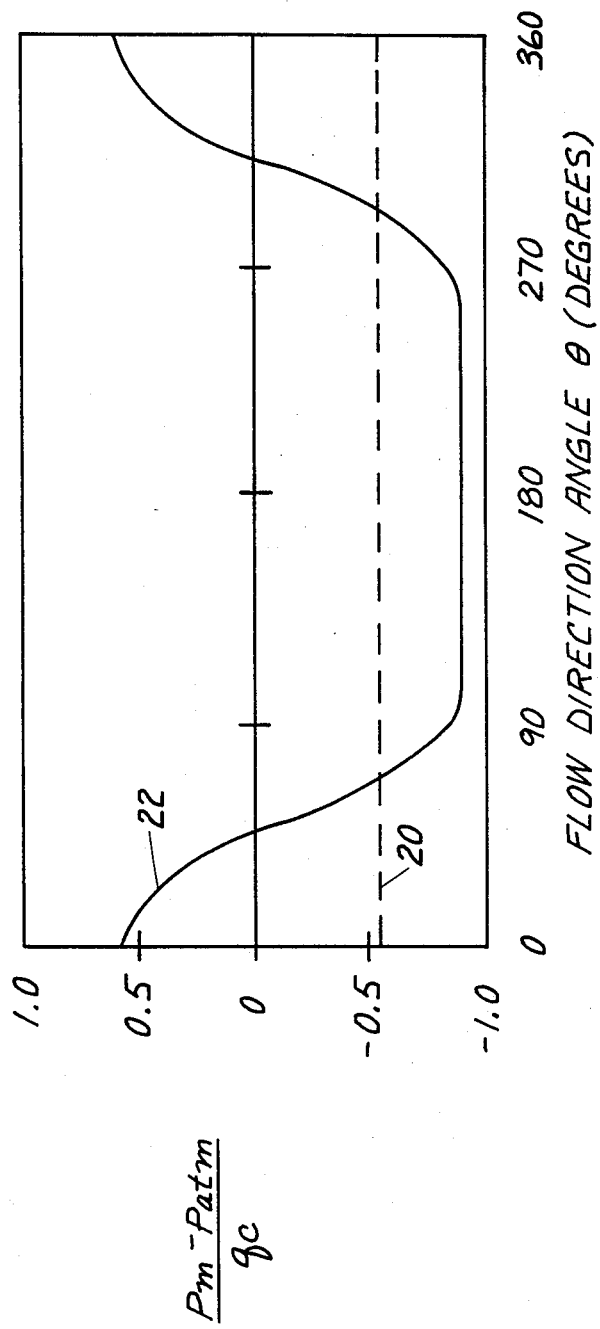
FIG. 3 graph of typical static pressure variations around cylindrical enclosures made according to the present invention and in cross flow.
Figure 4:
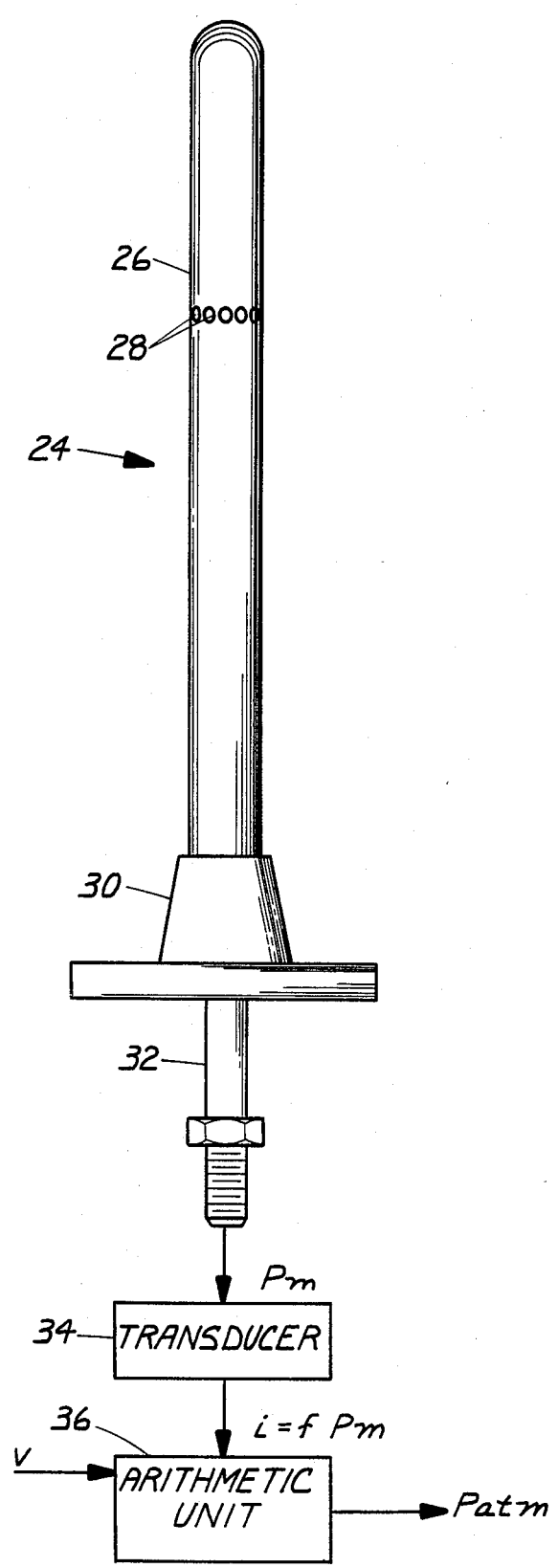
FIG. 4 side view of a 12 port cylindrical sensor.

Given an enclosure, such as the one shown in FIG. 4, having a plurality of ports placed equiangularly around the circumference of the enclosure such that the wind is able to substantially impinge directly upon a port regardless of wind direction, it has been found that the error $(P_M - P_{ATM})$ due to the wind is proportional to the impact pressure of the wind, $q_c$. The measured pressure inside the enclosure is $P_M$ and $P_{ATM}$ is true atmospheric pressure. It has been further determined that the error coefficient, $$\frac{P_M - P_{ATM}}{q_c}$$

is substantially a constant, $K_1$, regardless of the velocity of the wind; accordingly the relationship yields the equation $$\frac{P_M - P_{ATM}}{q_c} = K_1$$

for all wind velocities. $K_1$ for a sensor of the type illustrated in FIG. 4 is shown by line 20 on the graph shown in FIG. 3. FIG. 3 shows a plot of the constant $K_1$, which equates to $$\frac{P_M - P_{ATM}}{q_c}$$

plotted against flow direction angle, $\theta$ in degrees. In this graph, the sensor is an elongated cylinder of the type shown in FIGS. 4 and 5. Flow direction $\theta$ defines a plane normal to the longitudinal axis of the sensor and varying through directions represented by 0° to 360° that are conventional to compass card notation. It has been shown that for cylindrical sensors having a plurality of ports equiangularly spaced around the circumference of the sensor, that $K_1$ is negative and has substantially the same value regardless of the direction of flow. The twelve port sensor tested had a $K_1 = -0.55$. The value of $K_1$ for sensor having other configurations is dependent largely on the shape of the sensor and the number and shape of the ports.

Knowing $K_1$, the sensor may be utilized to accurately obtain $P_{ATM}$ by solving the above relationship for $P_{ATM}$. The relationship $$K_1 = \frac{P_M - P_{ATM}}{q_c}$$

yields $P_{ATM} = P_M + K_1 q_c$. Throughout the wind velocity range, impact pressure is $q_c = \frac{1}{2} \rho V^2$, where $\rho$ is the density of the fluid and V is the fluid flow velocity. Substituting this for $q_c$ and establishing $K_2 = \frac{1}{2} K_1$, yields the equation $P_{ATM} = P_M + K_2 \rho V^2$. This can be further simplified to $P_{ATM} = P_M + K_3 V^2$. This final equation assumes that $\rho = \rho_{sl}$, which is standard sea level density, a constant value. $K_3$ then equals $K_2 \rho_{sl}$. Wind velocity, measured by any convenient anemometer, is required to complete the equation to determine atmospheric pressure from the sensor.

Sensor 24, shown in FIG. 4 is a device the performance of which can be described by the above equation. Sensor 24 has an elongated, cylindrical housing 26. Housing 26 is comprised of tubing having a central chamber. A plurality of ports 28, in this case twelve, are equiangularly disposed around the circumference of housing 26. Ports 28 pass through the wall of housing 26 and connect the central chamber to the environment around sensor 28.

Housing 26 is mounted in base 30. Base 30 may be mounted to a supporting structure as desired. Tube 32 passes through base 30 and is connected to the central chamber of housing 26. The signal $P_M$ is obtained from tube 32.

$P_M$ is supplied to transducer 34, shown schematically. Transducer 34 changes the pressure signal to an electrical signal that is a function of $P_M$. Such electrical signal is supplied to computer 36 along with an electrical signal that is a function of flow velocity V. Such signal may be obtained from a convenient anemometer. The value of $K_3$ for sensor 26 is stored in arithmetic unit 36.

Arithmetic unit 36 is mechanized to perform the function represented by $P_M + K_3 V^2$ to yield an electrical signal output that is a function of $P_{ATM}$.

The constant $K_3$ is a function of the shape of enclosure 26 and ports 28 of sensor 24 as shown in FIG. 4. Each sensor has a unique constant $K_3$. Such constant may be determined under known conditions of $P_{ATM}$, $P_M$ and V. Testing to determine $K_3$ may be done, for example, in a wind tunnel where $P_{ATM}$ and V are known and $P_M$ is the measured pressure in the sensor at the known $P_{ATM}$ and V. $K_3$ then equals $$\frac{(P_{ATM} - P_M)}{V^2}.$$

A further embodiment of a sensor that lends itself to use with a constant as determined by the above method is shown in FIGS. 5 and 6. Such a sensor is as made substantially according to the invention disclosed in U.S. Pat. No. 3,646,811 held by the same assignee as the present application and which is incorporated herein by reference. The '811 sensor is primarily a sensor of fluid velocity. Fluid velocity may be airspeed which comprises wind velocity or air vehicle velocity or both. The sensor shown in FIGS. 5 and 6 is improved to also determine atmosphere pressure. The method of determining such velocity is fully explained in the '811 patent. Briefly, sensor 40 is comprised of housing 42 mounted in base 44. Housing 42 is an elongated tube capped at the end. The interior of housing 42 is divided by walls 43 and 45 into two chamber pairs as shown in FIG. 6. The chambers are numbered 46, 48, 50 and 52. Chambers 46 and 50 lie substantially in the X plane and comprise an oppositely facing chamber pair and chambers 48 and 52 lie substantially in the Y plane and comprise an oppositely facing chamber pair. Thus, there are two longitudinally extending chambers 46 and 50, which are diametrically opposed or on opposite sides of the quadrants defined by walls 43 and 45, and similar chambers 48 and 52, which are also diametrically opposed.

Each chamber has pressure ports that pass through housing 42 and connect the respective chamber to the environment around sensor 40. Ports 54 enter chamber 46, ports 56 enter chamber 48, ports 58 enter chamber 50 and ports 60 enter chamber 52. Ports 54 face generally in opposite direction from ports 58 and ports 56 face generally in opposite direction from ports 60. Tubes 46A, 48A, 50A, and 52A, shown in both FIGS. 5 and 6, convey measured pressure signals from chambers 46, 48, 50 and 52 respectively.

As disclosed in the '811 patent, it has been determined that fluid velocity is determined according to the relationship $V = C(\Delta P_{46,50} + \Delta P_{48,52})^{\frac{1}{2}}$, where V equals fluid velocity, C is a calibration constant, $\Delta P_{46,50}$ is the pressure differential between chambers 46 and 50 and $\Delta P_{48,52}$ is the pressure differential between chambers 48 and 52. Accordingly, the pressure signals from chambers 46 and 50 are provided to differential pressure transducer 62. The output of transducer 62 is an electrical signal that is a function of the pressure differential between chambers 46 and 50. Such electrical signal is also fed to arithmetic unit 64. The pressure signal from chambers 48 and 52 are provided to differential pressure transducer 66. The output of transducer 66 in an electrical signal that is a function of the pressure differential between chambers 48 and 52. Such electrical signal is fed to arithmetic unit 64. Arithmetic unit 64 performs the arithmetic functions necessary to generate an electrical signal that is a function of fluid velocity in accordance with the aforementioned relationship.

Fluid vector 71 is shown in FIG. 6. The direction of flow relative to the X axis is shown by the angle $\theta$. It has been disclosed in the '811 patent that $\theta$ may be determined by the relationship Cos $2\theta =$ $$\frac{\Delta P_{46,50}}{\Delta P_{46,50} + \Delta P_{48,52}}.$$

Arithmetic unit 64 performs the necessary arithmetic functions to determine flow direction, $\theta$, as a function of the aformentioned relationship.

It has been determined that each of the four pressure determined above is dependent upon flow direction and magnitude. When the pressure sensed in a chamber, in the following example chamber 46, is utilized to represent atmospheric or barometric pressure, this dependence is represented by the relationship $P_{ATM} = P_M + K_4 V^2 f(\theta)$, where $P_{ATM}$ is atmospheric or barometric pressure, $P_M$ is the measured pressure in the chamber 46, $K_4$ is a calibration constant, V is fluid velocity and $f(\theta)$ is a variable that is dependent on wind direction but is independent of wind velocity. The $f(\theta)$ for the specific device shown in FIGS. 5 and 6 is shown as curve 22 on FIG. 3. This function is mechanized in arithmetic unit 64. Where arithmetic unit 64 comprises a programmable device, the programming of arithmetic unit 64 is a standard operation well within the skill of the ordinary programmer.

To utilize this characteristic to obtain atmospheric or barometric pressure, tube 70 is connected to one of the four tubes 46A, 48A, 50A, and 52A. In the embodiment shown, tube 70 is connected to tube 46A and receives the measured pressure signal from chamber 46. Such pressure comprises $P_M$, the measured pressure and is the same pressure as the pressure conveyed by tube 46A. Such pressure is supplied to pressure tranducer 72. Pressure transducer 72 converts such pressure to an electrical signal that is a function of $P_M$, the pressure sensed in chamber 46. Such electrical signal is fed to arithmetic unit 64. Arithmetic unit 64 performs the necessary arithmetic functions to determine $P_{ATM} = P_M + K_4 V^2 f(\theta)$. The values for V and $\theta$ being determined as indicated in the aforementioned description of the means of determining fluid flow velocity V and direction $\theta$.

Where sensor 40 is utilized at a fixed ground site, it is convenient to orient the X axis of the sensor 40 and chamber 46 in a north direction so that wind direction, $\theta$, is related to north. Where sensor 40 is utilized on a moveable platform, such as an air vehicle, it is convenient to orient the X axis of sensor 40 and chamber 46 to face forward so that wind direction, $\theta$, is related the nose of the air vehicle.

The physical changes to the device of the '811 patent are not complex. Nonetheless, the improvement substantially increases the utility of the device. No additional pressure sensing ports are needed in the '811 device in order to obtain an accurate atmospheric or barometric pressure, thus eliminating the need for two sensors in applications requiring both wind and atmospheric pressure data. This can all be accomplished simply by adding a T to pressure line without modification of the sensor portion of the '811 device. Further, as described in the '811 patent, the pressure sensing ports are deiced, thereby avoiding one of the limitations of the prior art. Accordingly, it is believed that the present invention represents a substantial advancement of the art, satisfying the requirements for patentability.

What is claimed is:

1. A sensing instrument for sensing atmospheric pressure of a fluid medium comprising enclosure means having a shape exposed to the fluid medium, which fluid medium has a certain density is moving at a certain velocity relative to the sensing instrument, which velocity is determined by an external source, the enclosure means providing an internal chamber, the sensing instrument having at least one sensing port means having a preselected shape open to the fluid medium and to the internal chamber for sensing a measured pressure of the fluid medium, the chamber being closed to prevent fluid flow of the fluid being sensed therethrough, such measured pressure being corrected for the effects of the velocity of the fluid medium according to the formula $$P_{ATM} = P_M + K\ V^2$$

where $P_{ATM}$ is atmospheric pressure, $P_M$ is measured pressure in the chamber of the enclosure means, K is a constant that is a function of the shape of the enclosure means, the shape and number of the port means and the density of the fluid medium, and V is the velocity of the fluid medium and is supplied from the outside source.

2. A sensing instrument for sensing atmospheric pressure of a fluid medium comprising enclosure means forming an internal chamber and having a shape exposed to the fluid medium, which fluid medium may be moving at a certain velocity and direction relative to the sensing instrument, the sensing instrument having sensing port means having a certain shape and being open to the fluid medium for sensing a measured pressure of the fluid medium, the internal chamber being closed to fluid flow therethrough during use except for the sensing port means, such measured pressure being corrected for the effects of the velocity of the fluid medium according to the formula $$P_{ATM} = P_M + K\ V^2 f(O)$$

where $P_{ATM}$ is atmospheric pressure, $P_M$ is measured pressure in the enclosure means, K is a calibration constant, V is velocity of the fluid medium and f(O) is a variable that is a function of the shape of the enclosure means and the shape of the sensing port means and the direction of movement of the fluid medium, where O is the direction of the movement of the fluid medium relative to the sensing port means.

3. A method of correcting static pressure of a fluid medium for the effects the fluid medium motion velocity and direction utilizing enclosure means having at least one port means open to the fluid medium, comprising the steps of:

obtaining a variable, $f(\theta)$, for the enclosure means through testing thereof that is a function of the shape of the enclosure means, the shape of the port means and the direction of fluid medium motion where $\theta$ is the direction of the fluid medium motion relative to the port means obtaining a calibration constant, K, obtaining a fluid motion velocity signal, V, and direction signal, $\theta$, relative to the port means obtaining a measured pressure signal, $P_M$, within the enclosure means providing means to receive the measure pressure signal and the fluid medium motion velocity signal, V, and direction signal, $\theta$, and deliver a signal equal to the formula $P_{ATM} = P_M + KV^2 f(\theta)$, where $P_{ATM}$ equals atmospheric pressure.

4. An improved device for sensing atmospheric pressure and airspeed in at least one direction comprising a probe having an enclosure with a longitudinal axis, wall means in the enclosure dividing the enclosure into at least two interior chambers forming chamber pairs, a plurality of separate ports opening to each of the chambers, the ports for each chamber in a chamber pair facing generally in opposite direction from the ports of the other chamber in the chamber pair and being oriented substantially symmetrically with respect to a plane defined by the longitudinal axis and a line parallel to the one direction, and means to deliver a signal proportional to the pressure difference between the chambers in each chamber pair, the improvement comprising means to deliver a signal proportional to the pressure in at least one of said chambers.

5. The device as specified in claim 4 wherein the enclosure is substantially symmetrical about a plane defined by the longitudinal axis of the enclosure and a line parallel to the direction of measurement.

6. The device as specified in claim 4 wherein the enclosure has a circular cross section.

7. The device as specified in claim 4 wherein the wall means divide the enclosure into four interior chambers forming two pairs of chambers, and wherein the ports are positioned to sense pressure in direction along two substantially coplanar measurement axes which intersect said longitudinal axis, and wherein the ports for each pair of chambers are substantially symmetrical with respect to a plane defined by the measurement axis associated with that chamber pair and the longitudinal axis of the enclosure.

8. The device as claimed in claim 4 wherein the means to deliver a signal proportional to the pressure difference between the chambers of each chamber pair comprises differential pressure transducer means associated with each chamber pair and the means to deliver a signal proportional to the pressure in a chamber comprises pressure transducer means.

9. The device as claimed in claim 4 and arithmetic means responsive to the signal proportional to the pressure difference between the chambers in each chamber and responsive to the signal proportional the pressure in a chamber, which signals are a function of $P_M$, V and $\theta$, the arithmetic means to deliver a signal corresponding to the formula: $P_{ATM} = P_M + KV^2 f(\theta)$ where $P_{ATM}$ is atmospheric pressure, $P_M$ is measured pressure in a chamber, K is a calibration constant, V is airspeed and $f(\theta)$ is a variable that is a function of the shape of the enclosure means and the shape of the port means and the direction of V, where $\theta$ is such direction of the fluid medium relative to the port means.

10. An improved device for sensing the velocity vector of a fluid stream in direction along a fixed axis extending in first and second substantially opposite directions, comprising sensing means including means defining at least first and second chambers forming a pair of chambers, said first and second chambers each having a pair of separated ports symmetrically located with respect to the fixed axis direction forming openings to their respective chambers, the major portion of the opening of said first chamber in said set facing in said first direction and being positioned in preselected relationship to the fixed axis, the major portion of the opening of the second chamber in the set facing in said second direction and being positioned in substantially opposed relationship to the first port means with respect to the direction of the axis, and means to provide a signal which is a function of the pressure difference between the first and second chambers only and correlated to a known relationship between fluid velocity along the axis and the differential pressure between the first and second chambers, wherein the improvement comprises means to provide a signal which is a function of the pressure in one of said chambers and correlated to a known relationship between fluid velocity and direction relative to the device.

11. The combination as specified in claim 10 wherein said first and second chambers are positioned substantially symmetrically with respect to a first plane normal to said axis and bisecting the sensing means.

12. The combination as specified in claim 11 wherein said first and second chambers are each substantially symmetrical with respect to a plane passing through said axis.

* * * * *

UNITED STATES PATENT AND TRADEMARK OFFICE
CERTIFICATE OF CORRECTION

PATENT NO. : 4,522,070
DATED : June 11, 1985
INVENTOR(S) : Floyd W. Hagen

It is certified that error appears in the above-identified patent and that said Letters Patent is hereby corrected as shown below:

In column 2, line 37, delete the word "thread" and insert therefor --threaded--.

In column 4, lines 9-10, the phrase "$P_{ATM}$ and V are known and $P_M$" should not be in italic letters.

In column 4, line 66, delete the word "in" and insert therefor --is--.

*Signed and Sealed this*

*Twenty-second* Day of *October 1985*

[SEAL]

*Attest:*

*Attesting Officer*

DONALD J. QUIGG

*Commissioner of Patents and Trademarks—Designate*